(12) United States Patent
Tomimatsu

(10) Patent No.: US 12,296,966 B2
(45) Date of Patent: May 13, 2025

(54) AIRCRAFT

(71) Applicant: HONDA MOTOR CO., LTD., Tokyo (JP)

(72) Inventor: Masaru Tomimatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/328,893

(22) Filed: Jun. 5, 2023

(65) Prior Publication Data
US 2023/0391449 A1   Dec. 7, 2023

(30) Foreign Application Priority Data
Jun. 7, 2022   (JP) ................. 2022-092227

(51) Int. Cl.
| | | |
|---|---|---|
| *B64D 27/35* | (2024.01) | |
| *B64C 29/00* | (2006.01) | |
| *B64D 27/30* | (2024.01) | |
| *B64D 27/31* | (2024.01) | |
| *B64D 27/32* | (2024.01) | |
| *B64D 27/33* | (2024.01) | |

(52) U.S. Cl.
CPC .............. *B64D 27/32* (2024.01); *B64C 29/00* (2013.01); *B64D 27/30* (2024.01); *B64D 27/31* (2024.01); *B64D 27/33* (2024.01); *B64D 27/35* (2024.01); *B64D 2221/00* (2013.01)

(58) Field of Classification Search
CPC ......... B64D 27/33; B64D 27/02; B64D 27/35
See application file for complete search history.

(56) References Cited

U.S. PATENT DOCUMENTS

| | | | |
|---|---|---|---|
| 8,196,860 B2 | 6/2012 | Gall et al. | |
| 9,994,330 B2 | 6/2018 | Moxon | |
| 11,084,595 B2 | 8/2021 | Murrow | |
| 11,485,488 B1* | 11/2022 | Armer | B64C 29/0033 |
| 11,639,229 B1* | 5/2023 | Richter | B64D 31/00 |
| | | | 307/142 |
| 2018/0305005 A1* | 10/2018 | Parks | B64D 27/24 |
| 2020/0115045 A1 | 4/2020 | Mermoz et al. | |
| 2021/0362866 A1* | 11/2021 | Tian | B64C 1/22 |
| 2021/0387723 A1* | 12/2021 | Moon | B64D 27/02 |
| 2022/0306307 A1* | 9/2022 | Tsutsumi | B60L 58/13 |
| 2022/0315214 A1* | 10/2022 | Mitani | B60L 58/21 |
| 2022/0315237 A1* | 10/2022 | Fukuchi | B64U 20/98 |
| 2024/0034477 A1* | 2/2024 | Eto | B64D 35/024 |

* cited by examiner

*Primary Examiner* — Tye William Abell
*Assistant Examiner* — Justin Michael Heston
(74) *Attorney, Agent, or Firm* — Rankin, Hill & Clark LLP

(57) ABSTRACT

An aircraft includes: a gas turbine for driving a generator; a first electric motor for driving a first rotor; and a second electric motor for driving a second rotor. The gas turbine is arranged in a manner so that the gas turbine overlaps a rear wing in the front-rear direction of a fuselage, and a first high-voltage harness for transmitting electric power to the first electric motor and a second high-voltage harness for transmitting electric power to the second electric motor are arranged inside the rear wing so as to be separated from each other in the front-rear direction of the fuselage.

6 Claims, 4 Drawing Sheets

AIRCRAFT

CROSS-REFERENCE TO RELATED APPLICATIONS

This application is based upon and claims the benefit of priority from Japanese Patent Application No. 2022-092227 filed on Jun. 7, 2022, the contents of which are incorporated herein by reference.

BACKGROUND OF THE INVENTION

Field of the Invention

The present invention relates to an aircraft.

DESCRIPTION OF THE RELATED ART

US 2020/0115045 A1 discloses an electric multirotor aircraft. The electric multirotor aircraft includes a plurality of rotors that generate thrust. Each rotor is rotationally driven by an electric motor provided corresponding to the rotor. Each electric motor is operated by electric power generated by a generator.

SUMMARY OF THE INVENTION

The electric multirotor aircraft disclosed in US 2020/0115045 A1 includes an engine for generating electric power. In an aircraft including an engine, fragments are scattered if a rotor burst occurs in the engine, and it is therefore necessary to design the arrangement of respective components in consideration of contact with the scattered engine fragments. In the electric multirotor aircraft disclosed in US 2020/0115045 A1, there is room for improvement in the design of the arrangement of the components.

An object of the present invention is to solve the above-mentioned problem.

According to a first aspect of the present invention, there is provided an aircraft comprising: a wing attached to a fuselage and configured to generate lift; a generator configured to generate electric power; an engine configured to drive the generator; a first rotor configured to generate thrust in a vertical direction; a second rotor configured to generate thrust in the vertical direction; a first electric motor configured to drive the first rotor; a second electric motor configured to drive the second rotor; a first harness that is at least partially wired inside the wing and is configured to transmit the electric power generated by the generator to the first electric motor; and a second harness that is at least partially wired inside the wing and is configured to transmit the electric power generated by the generator to the second electric motor, wherein the engine is arranged in a manner so that the engine overlaps the wing in a front-rear direction of the fuselage, and the first harness and the second harness are arranged inside the wing so as to be separated from each other in the front-rear direction of the fuselage.

According to a second aspect of the present invention, there is provided an aircraft comprising: a wing attached to a fuselage and configured to generate lift; a generator configured to generate electric power; an engine configured to drive the generator; a first rotor configured to generate thrust in a vertical direction; a second rotor configured to generate thrust in the vertical direction; a first electric motor configured to drive the first rotor; and a second electric motor configured to drive the second rotor, wherein the engine is arranged in a manner so that the engine overlaps the wing in a front-rear direction of the fuselage, and the engine is arranged in a manner so that the engine overlaps, in the front-rear direction of the fuselage, a region between a rotation trajectory of the first rotor and a rotation trajectory of the second rotor.

The present invention makes it possible to improve the arrangement of the respective components of the aircraft.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Outline of Aircraft]

Figure 1:
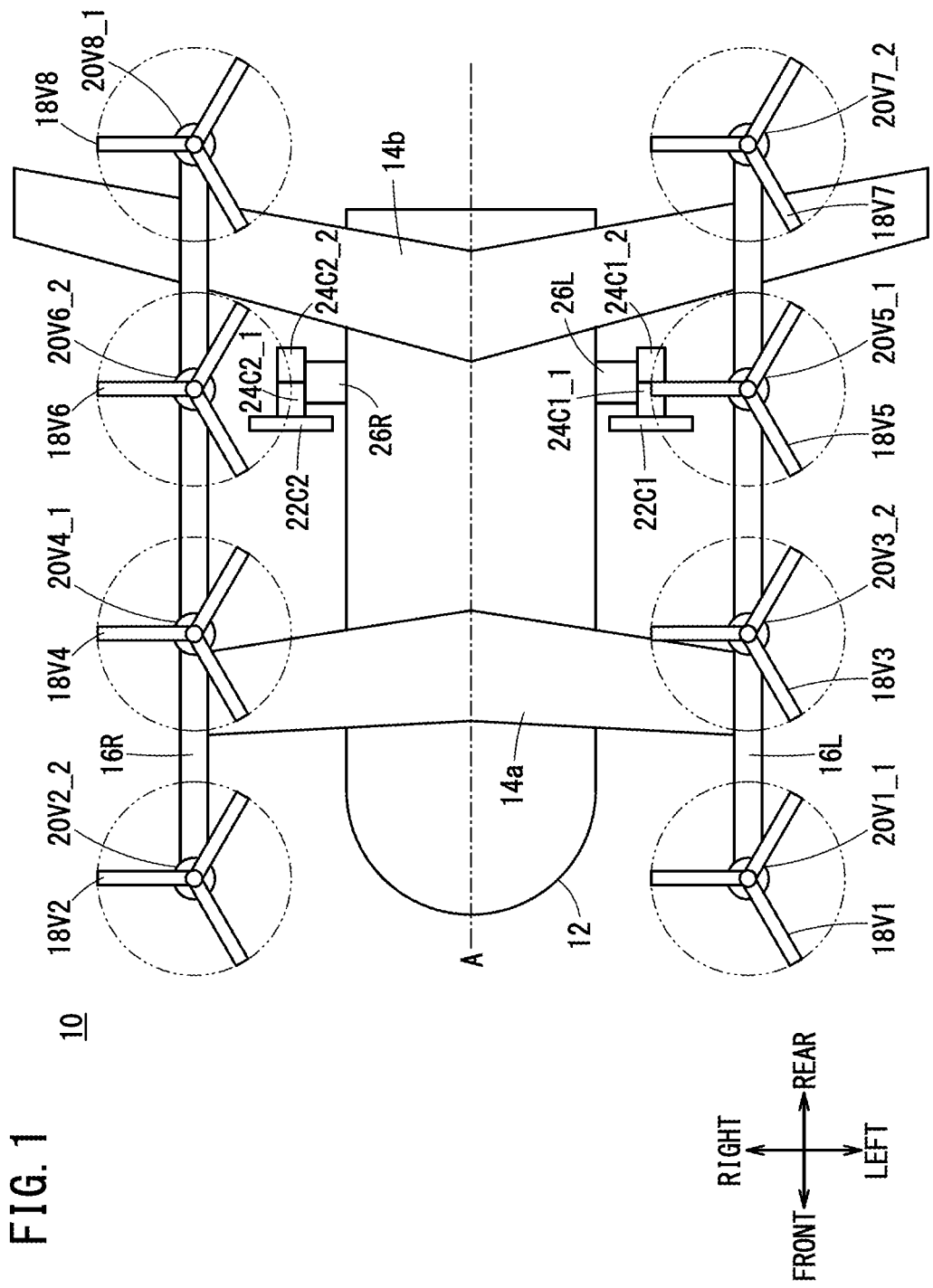
FIG. 1 is a schematic diagram of an aircraft.

FIG. 1 is a schematic diagram of an aircraft 10. The aircraft 10 of the present embodiment is an electric vertical take-off and landing aircraft (eVTOL aircraft). The aircraft 10 includes a plurality of rotors. Each rotor is driven by one or a plurality of electric motors. When the rotor is driven, the rotor generates vertical thrust and horizontal thrust.

The aircraft 10 is a hybrid aircraft. The aircraft 10 includes a generator and a battery as power sources of the electric motor. In the aircraft 10, electric power generated by the generator is supplied to the electric motor. When the electric power generated by the generator is insufficient with respect to the required electric power, the electric power stored in the battery is supplied to the electric motor.

[Configuration of Aircraft]

The aircraft 10 includes a fuselage 12. The fuselage 12 is provided with a cockpit, a cabin, and the like. A pilot rides in the cockpit and controls the aircraft 10. Passengers and the like ride in the cabin. The aircraft 10 may be automatically controlled.

The aircraft 10 is a tandem wing aircraft. The aircraft 10 includes a front wing 14a and a rear wing 14b as main wings. The rear wing 14b is a swept wing. When the aircraft 10 moves forward, lift is generated in each of the front wing 14a and the rear wing 14b. The rear wing 14b corresponds to a wing of the present invention.

The aircraft 10 includes eight VTOL rotors 18V. The eight VTOL rotors 18V are a rotor 18V1, a rotor 18V2, a rotor 18V3, a rotor 18V4, a rotor 18V5, a rotor 18V6, a rotor 18V7, and a rotor 18V8. The rotor 18V5 corresponds to a first rotor of the present invention. The rotor 18V7 corresponds to a second rotor of the present invention.

One VTOL electric motor 20V is provided for each VTOL rotor 18V. That is, an electric motor 20V1_1 is provided for the rotor 18V1. An electric motor 20V2_2 is provided for the rotor 18V2. An electric motor 20V3_2 is provided for the rotor 18V3. An electric motor 20V4_1 is provided for the rotor 18V4. An electric motor 20V5_1 is provided for the rotor 18V5. An electric motor 20V6_2 is provided for the rotor 18V6. An electric motor 20V7_2 is provided for the rotor 18V7. An electric motor 20V8_1 is provided for the rotor 18V8.

Each VTOL rotor 18V is driven by each VTOL electric motor The electric motor 20V5_1 corresponds to a first electric motor of the present invention. The electric motor 20V7_2 corresponds to a second electric motor of the present invention.

A boom 16L and a boom 16R are attached to the front wing 14a and the rear wing 14b. The boom 16L is disposed on the left side of a center line A of the fuselage 12 in the left-right direction. The boom 16R is disposed on the right side of the center line A. The boom 16L and the boom 16R are arranged to be separated from the fuselage 12. The boom 16L and the boom 16R extend in the front-rear direction of the fuselage 12.

The rotor 18V1, the rotor 18V3, the rotor 18V5, and the rotor 18V7 are attached to the boom 16L. The rotor 18V2, the rotor 18V4, the rotor 18V6, and the rotor 18V8 are attached to the boom 16R.

In addition, the electric motor 20V1_1, the electric motor 2, the electric motor 20V5_1, and the electric motor 20V7_2 are attached to the boom 16L. The electric motor 20V2_2, the electric motor 20V4_1, the electric motor 20V6_2, and the electric motor 20V8_1 are attached to the boom 16R.

Each VTOL rotor 18V generates thrust primarily in the vertical direction. The thrust of each VTOL rotor 18V is controlled by adjusting the rotational speed of the rotor and the pitch angle of the blades. Each VTOL rotor 18V is mainly used during vertical take-off, during transition from vertical take-off to cruising, during transition from cruising to vertical landing, during vertical landing, during hovering, and the like. Further, each VTOL rotor 18V is used during attitude control.

By controlling the thrust of each VTOL rotor 18V, a propulsive force is applied mainly upward to the fuselage 12. By controlling the thrust of each VTOL rotor 18V, a roll moment, a pitch moment, and a yaw moment are caused to act on the fuselage 12.

The aircraft 10 includes two cruise rotors 22C. The two cruise rotors 22C are a rotor 22C1 and a rotor 22C2. The rotor 22C1 corresponds to a third rotor of the present invention.

Two cruise electric motors 24C are provided for each cruise rotor 22C. That is, an electric motor 24C1_1 and an electric motor 24C1_2 are provided for the rotor 22C1. An electric motor 24C2_1 and an electric motor 24C2_2 are provided for the rotor 22C2. One cruise rotor 22C is driven by the two cruise electric motors 24C. The electric motor 24C1_1 and the electric motor 24C1_2 correspond to a third electric motor of the present invention.

A mount 26L and a mount 26R are attached to the side surface of the fuselage 12. The mount 26L extends leftward from the left side surface of the fuselage 12. The mount 26R extends rightward from the right side surface of the fuselage 12.

The rotor 22C1 is attached to the mount 26L together with the electric motor 24C1_1 and the electric motor 24C1_2. The rotor 22C2 is attached to the mount 26R together with the electric motor 24C2_1 and the electric motor 24C2_2.

Each cruise rotor 22C generates thrust mainly in the horizontal direction. The thrust of each cruise rotor 22C is controlled by adjusting the rotational speed of the rotor and the pitch angle of the blades. Each cruise rotor 22C is mainly used during transition from vertical take-off to cruising, during cruising, during transition from cruising to vertical landing, and the like. By controlling the thrust of each cruise rotor 22C, a propulsive force is applied mainly forward to the fuselage 12.

In the present embodiment, each cruise rotor 22C is attached to the mount 26L or the mount 26R attached to the side surface of the fuselage 12. Alternatively, each cruise rotor 22C may be attached to the rear of the fuselage 12. More specifically, each cruise rotor 22C may be attached rearwardly of the rear wing 14b.

[Configuration of Power Supply System]

Figure 2:
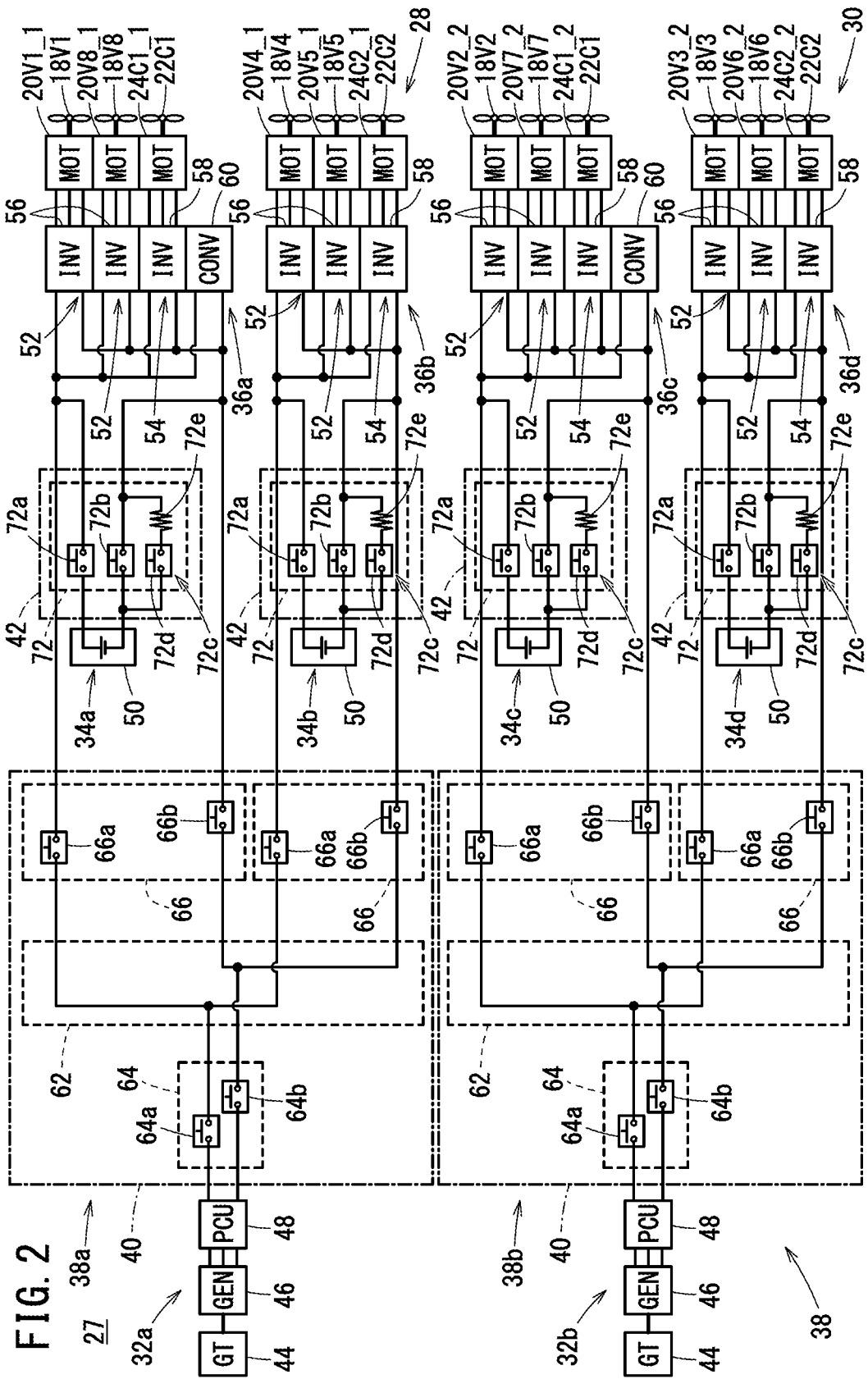
FIG. 2 is a schematic diagram showing a configuration of a power supply system.

FIG. 2 is a schematic diagram showing a configuration of a power supply system 27.

The aircraft 10 includes the electric motor 20V1_1, the electric motor 20V4_1, the electric motor 20V5_1, the electric motor 20V8_1, the electric motor 24C1_1, and the electric motor 24C2_1 as drive sources of a first drive system 28.

The aircraft 10 includes the electric motor 20V2_2, the electric motor 20V3_2, the electric motor 20V6_2, the electric motor 20V7_2, the electric motor 24C1_2, and the electric motor 24C2_2 as drive sources of a second drive system 30.

The power supply system 27 includes two main power source devices 32. The two main power source devices 32 are a first main power source device 32a and a second main power source device 32b.

The power supply system 27 includes four auxiliary power source devices 34. The four auxiliary power source devices 34 are a first auxiliary power source device 34a, a second auxiliary power source device 34b, a third auxiliary power source device 34c, and a fourth auxiliary power source device 34d.

The power supply system 27 supplies electric power to four load modules 36. The four load modules 36 are a first load module 36a, a second load module 36b, a third load module 36c, and a fourth load module 36d.

The power supply system 27 includes a power supply circuit 38. The power supply circuit 38 includes a first power supply circuit 38a and a second power supply circuit 38b. The first power supply circuit 38a and the second power supply circuit 38b are not connected to each other and are provided independently. The first power supply circuit 38a and the second power supply circuit 38b may be switched between a state in which they are connected to each other and a state in which they are disconnected from each other via a contactor unit or the like.

Each of the first power supply circuit 38a and the second power supply circuit 38b includes a main power source circuit 40 and auxiliary power source circuits 42. The main power source circuit 40 is provided corresponding to each main power source device 32. The auxiliary power source circuits 42 are each provided corresponding to each auxiliary power source device 34.

Each main power source device 32 includes a gas turbine 44, a generator 46, and a power control unit (hereinafter referred to as PCU) 48.

The gas turbine 44 includes a compressor, a combustion chamber, and a turbine, which are not shown. The compressor compresses the intake air. The compressed air is supplied to the combustion chamber. In the combustion chamber, fuel is injected into the high-pressure air. As a result, the fuel is burned. The gas generated by the combustion of the fuel rotates the turbine. With the rotational power of the turbine, the gas turbine 44 drives the generator 46. As a result, the generator 46 generates electric power. The gas turbine 44 corresponds to an engine of the present invention.

The PCU 48 converts the AC power generated by the generator 46 into DC power and outputs the DC power to the main power source circuit 40. When the gas turbine 44 is started, the PCU 48 converts DC power supplied from the auxiliary power source device 34 to be described later into AC power and outputs the AC power to the generator 46. The generator 46 is operated by the AC power input from the PCU 48, and the generator 46 drives the gas turbine 44.

The first main power source device 32a supplies electric power to the first load module 36a and the second load module 36b. The second main power source device 32b supplies electric power to the third load module 36c and the fourth load module 36d.

Each auxiliary power source device 34 includes a battery 50. The battery 50 is charged with DC power supplied from the main power source device 32.

The first auxiliary power source device 34a supplies electric power to the first load module 36a. Further, the first auxiliary power source device 34a supplies electric power to the first main power source device 32a. The second auxiliary power source device 34b supplies electric power to the second load module 36b. Further, the second auxiliary power source device 34b supplies electric power to the first main power source device 32a. The third auxiliary power source device 34c supplies electric power to the third load module 36c. Further, the third auxiliary power source device 34c supplies electric power to the second main power source device 32b. The fourth auxiliary power source device 34d supplies electric power to the fourth load module 36d. Further, the fourth auxiliary power source device 34d supplies electric power to the second main power source device 32b.

Each load module 36 includes two VTOL drive units 52 and one cruise drive unit 54.

Each VTOL drive unit 52 includes an inverter 56 and the VTOL electric motor 20V. The inverter 56 is provided corresponding to each VTOL electric motor 20V. The inverter 56 converts the DC power supplied from the main power source circuit 40 into three phase AC power, and outputs the three phase AC power to the VTOL electric motor 20V.

The cruise drive unit 54 includes an inverter 58 and the cruise electric motor 24C. The inverter 58 is provided corresponding to each cruise electric motor 24C. The inverter 58 converts the DC power supplied from the main power source circuit 40 into three phase AC power, and outputs the three phase AC power to the cruise electric motor 24C.

Each of the first load module 36a and the third load module 36c includes a converter 60. The converter 60 steps down the voltage of the DC power supplied from the main power source device 32, and outputs the stepped-down power to a device operated by DC power. The device operated by DC power is, for example, a cooling device (not shown). The cooling device is a device that circulates cooling water between a heat exchanger and the PCU 48, the inverters 56, the inverter 58, and the like.

Each main power source circuit 40 includes a common bus 62. The common bus 62 connects one main power source device 32 and two load modules 36. The common bus 62 connects the two load modules 36 in parallel with the main power source device 32.

A contactor unit 64 is provided between the main power source device 32 and the common bus 62. The contactor unit 64 switches between a conduction state in which current flows between the main power source device 32 and the common bus 62, and an interruption state in which the flow of the current between the main power source device 32 and the common bus 62 is interrupted. The contactor unit 64 includes a contactor 64a and a contactor 64b. The contactor 64a is provided on a positive wire of the main power source circuit 40. The contactor 64b is provided on a negative wire of the main power source circuit 40. The contactor unit 64 may include only one of the contactor 64a or the contactor 64b.

A contactor unit 66 is provided between each load module 36 and the common bus 62. The contactor unit 66 switches between a conduction state in which current flows between each load module 36 and the common bus 62, and an interruption state in which the flow of the current between each load module 36 and the common bus 62 is interrupted. The contactor unit 66 includes a contactor 66a and a contactor 66b. The contactor 66a is provided on the positive wire of the main power source circuit 40. The contactor 66b is provided on the negative wire of the main power source circuit 40. The contactor unit 66 may include only one of the contactor 66a or the contactor 66b. When the contactor unit 64 includes only the contactor 64a, each contactor unit 66 preferably includes only the contactor 66b. When the contactor unit 64 includes only the contactor 64b, each contactor unit 66 preferably includes only the contactor 66a.

Each auxiliary power source circuit 42 is connected to each load module 36. The auxiliary power source circuit 42 supplies electric power from the auxiliary power source device 34 to the load module 36. A contactor unit 72 is provided between each auxiliary power source device 34 and each load module 36. The contactor unit 72 switches between a conduction state in which current flows between the auxiliary power source device 34 and the load module 36, and an interruption state in which the flow of the current between the auxiliary power source device 34 and the load module 36 is interrupted. The contactor unit 72 includes a contactor 72a, a contactor 72b, and a precharge circuit 72c. The contactor 72a is provided on a positive wire of the auxiliary power source circuit 42. The contactor 72b is provided on a negative wire of the auxiliary power source circuit 42. The precharge circuit 72c is provided in parallel with the contactor 72b. The precharge circuit 72c includes a contactor 72d and a resistor 72e.

The contactor unit 72 may include only the contactor 72b and the precharge circuit 72c. The precharge circuit 72c may be provided in parallel with the contactor 72a. In this case, the contactor unit 72 may include only the contactor 72a and the precharge circuit 72c.

[Wiring Structure in Aircraft]

Figure 3:
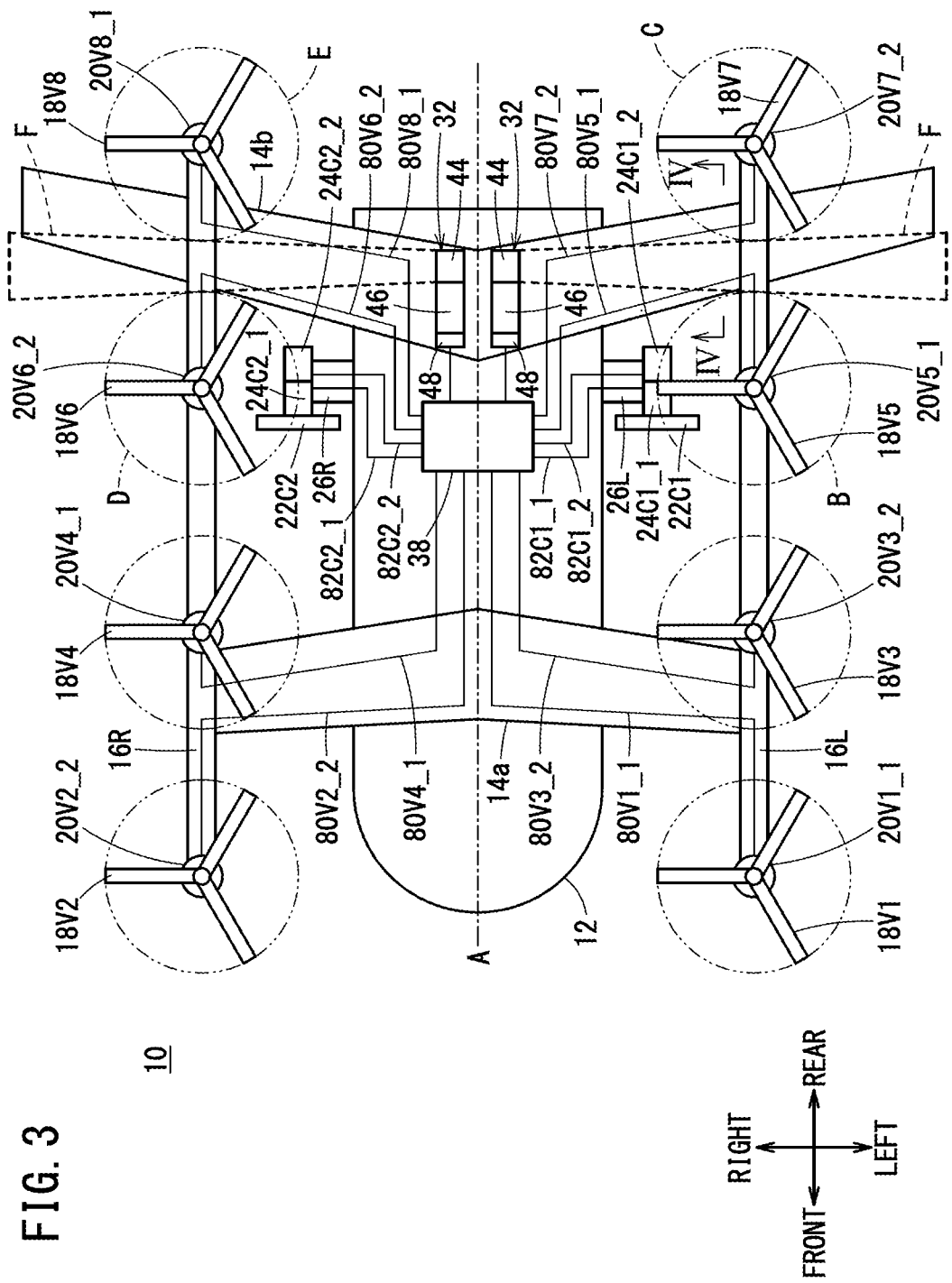
FIG. 3 is a schematic diagram showing a wiring structure in the aircraft.

FIG. 3 is a schematic diagram showing a wiring structure in the aircraft 10. The thin solid lines in FIG. 3 indicate the wiring of a high-voltage harness 80V for supplying electric power to each VTOL electric motor 20V, and a high-voltage harness 82C for supplying electric power to each cruise electric motor 24C.

The electric motor 20V1_1 and the power supply circuit 38 are connected by a high-voltage harness 80V1_1. The electric motor 20V2_2 and the power supply circuit 38 are connected by a high-voltage harness 80V2_2. The electric motor 20V3_2 and the power supply circuit 38 are connected by a high-voltage harness 2. The electric motor 20V4_1 and the power supply circuit 38 are connected by a high-voltage harness 80V4_1. The electric motor 20V5_1 and the power supply circuit 38 are connected by a high-voltage harness 80V5_1. The electric motor 20V6_2 and the power supply circuit 38 are connected by a high-voltage harness 2. The electric motor 20V7_2 and the power supply circuit 38 are connected by a high-voltage harness 80V7_2.

The electric motor 20V8_1 and the power supply circuit 38 are connected by a high-voltage harness 80V8_1. The high-voltage harness 80V5_1 corresponds to a first harness of the present invention. The high-voltage harness 80V7_2 corresponds to a second harness of the present invention.

Each of the high-voltage harness 80V1_1, the high-voltage harness 80V2_2, the high-voltage harness 80V3_2, and the high-voltage harness 80V4_1 is partially wired inside the front wing 14a. Each of the high-voltage harness 80V5_1, the high-voltage harness 80V6_2, the high-voltage harness 80V7_2, and the high-voltage harness 80V8_1 is partially wired inside the rear wing 14b.

Figure 4:
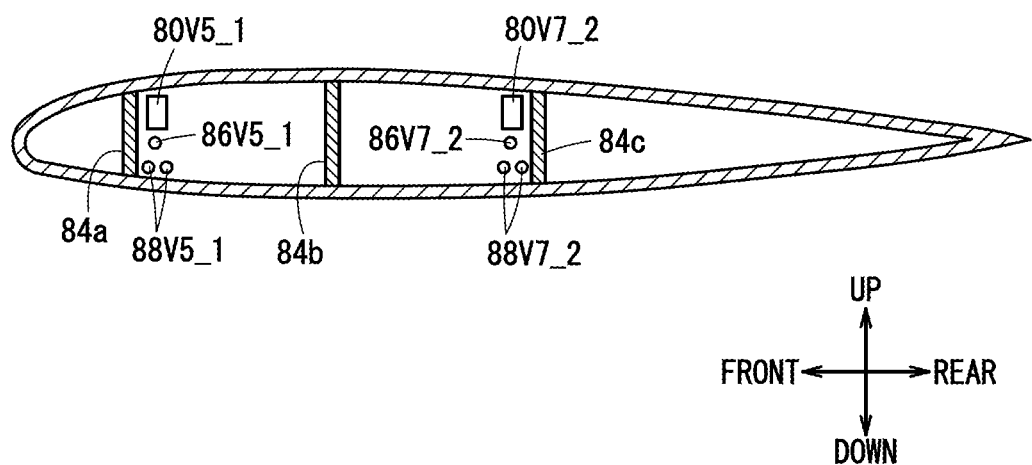
FIG. 4 is a schematic cross-sectional view of a rear wing.

FIG. 4 is a schematic cross-sectional view of the rear wing 14b. FIG. 4 shows a cross section of the rear wing 14b extending leftward relative to the fuselage 12, taken along the plane IV-IV shown in FIG. 3. The rear wing 14b includes three spars 84. The three spars 84 are a front spar 84a, a middle spar 84b, and a rear spar 84c. Each spar 84 extends in the longitudinal direction of the rear wing 14b.

As shown in FIG. 4, the high-voltage harness 80V5_1 is wired along the front spar 84a. The high-voltage harness 80V7_2 is wired along the rear spar 84c.

A low-voltage harness 86V5_1 and a low-voltage harness 86V7_2 are wired inside the rear wing 14b. The low-voltage harness 86V5_1 supplies electric power to a pitch adjustment mechanism (not shown) of the rotor 18V5. The pitch adjustment mechanism of the rotor 18V5 is a mechanism that changes the pitch angle of the blades of the rotor 18V5. The low-voltage harness 86V7_2 supplies electric power to a pitch adjustment mechanism (not shown) of the rotor 18V7. The pitch adjustment mechanism of the rotor 18V7 is a mechanism that changes the pitch angle of the blades of the rotor 18V7.

Cooling water pipes 88V5_1 and cooling water pipes 88V7_2 are arranged inside the rear wing 14b. Cooling water for cooling the electric motor 20V5_1 and the inverter 56 provided corresponding to the electric motor 20V5_1 flows through the cooling water pipes 88V5_1. Cooling water for cooling the electric motor 20V7_2 and the inverter 56 provided corresponding to the electric motor 20V7_2 flows through the cooling water pipes 88V7_2.

Components related to the rotor 18V5 are disposed in the front portion of the rear wing 14b, and components related to the rotor 18V7 are disposed in the rear portion of the rear wing 14b. That is, inside the rear wing 14b, the components related to the rotor 18V5 and the components related to the rotor 18V7 are arranged to be separated from each other in the front-rear direction of the fuselage 12. The components related to the rotor 18V5 are the high-voltage harness 80V5_1, the low-voltage harness 86V5_1, and the cooling water pipes 88V5_1. The components related to the rotor 18V7 are the high-voltage harness 80V7_2, the low-voltage harness 86V7_2, and the cooling water pipes 88V7_2.

Similarly, inside the rear wing 14b extending rightward relative to the fuselage 12, components related to the rotor 18V6 are disposed in the front portion of the rear wing 14b, and components related to the rotor 18V8 are disposed in the rear portion of the rear wing 14b. That is, inside the rear wing 14b, the components related to the rotor 18V6 and the components related to the rotor 18V8 are arranged to be separated from each other in the front-rear direction of the fuselage 12. The components related to the rotor 18V6 are the high-voltage harness 80V6_2 (FIG. 3), a low-voltage harness (not shown), and cooling water pipes (not shown). The components related to the rotor 18V8 are the high-voltage harness 80V8_1 (FIG. 3), a low-voltage harness (not shown), and cooling water pipes (not shown).

The electric motor 24C1_1 and the power supply circuit 38 are connected by a high-voltage harness 82C1_1. The electric motor 24C1_2 and the power supply circuit 38 are connected by a high-voltage harness 82C1_2. The electric motor 24C2_1 and the power supply circuit 38 are connected by a high-voltage harness 82C2_1. The electric motor 24C2_2 and the power supply circuit 38 are connected by a high-voltage harness 82C2_2. The high-voltage harness 82C1_1 and the high-voltage harness 82C1_2 correspond to a third harness of the present invention.

Each of the high-voltage harness 82C1_1 and the high-voltage harness 82C1_2 is partially wired inside the mount 26L. Each of the high-voltage harness 82C2_1 and the high-voltage harness 82C2_2 is partially wired inside the mount 26R.

[Arrangement of Gas Turbine]

As shown in FIG. 3, the main power source devices 32 are disposed in the fuselage 12. Each of the main power source devices 32 includes the gas turbine 44, the generator 46, and the PCU 48 that are arranged in this order from the rear of the fuselage 12. That is, the generator 46 and the PCU 48 are arranged forward of the gas turbine 44.

In the front-rear direction of the fuselage 12, each gas turbine 44 is arranged rearward of the cruise rotor 22C and the cruise electric motor 24C. In other words, the cruise rotor 22C and the cruise electric motor 24C are arranged forward of the gas turbine 44.

Each gas turbine 44 is arranged in a manner so that the gas turbine 44 overlaps the rear wing 14b in the front-rear direction of the fuselage 12. Each gas turbine 44 is arranged in a manner so that the gas turbine 44 overlaps, in the front-rear direction of the fuselage 12, a region between a rotation trajectory B of the rotor 18V5 and a rotation trajectory C of the rotor 18V7. Similarly, each gas turbine 44 is arranged in a manner so that the gas turbine 44 overlaps, in the front-rear direction of the fuselage 12, a region between a rotation trajectory D of the rotor 18V6 and a rotation trajectory E of the rotor 18V8.

In each gas turbine 44, the compressor and the turbine rotate about a rotation shaft (not shown) extending substantially parallel to the front-rear direction of the fuselage 12. Hereinafter, the compressor and the turbine may be collectively referred to as a rotor of the gas turbine 44.

A region F shown in FIG. 3 indicates a region in which there is a possibility that fragments of the rotor of the gas turbine 44 are scattered when the rotor burst occurs in the gas turbine 44.

As described above, the gas turbine 44 is arranged in a manner so that the gas turbine 44 overlaps, in the front-rear direction of the fuselage 12, the region between the rotation trajectory B of the rotor 18V5 and the rotation trajectory C of the rotor 18V7. As a result, the sum of a range in which the region F intersects the rotation trajectory B and a range in which the region F intersects the rotation trajectory C can be made smaller than in the case where the gas turbine 44 does not overlap, in the front-rear direction, the region between the rotation trajectory B and the rotation trajectory C. More preferably, the gas turbine 44 is arranged at such a position that the sum of the range in which the region F intersects the rotation trajectory B and the range in which the region F intersects the rotation trajectory C is minimized.

As described above, the gas turbine 44 is arranged in a manner so that the gas turbine 44 overlaps, in the front-rear direction of the fuselage 12, the region between the rotation trajectory D of the rotor 18V6 and the rotation trajectory E of the rotor 18V8. As a result, the sum of a range in which the region F intersects the rotation trajectory D and a range in which the region F intersects the rotation trajectory E can be made smaller than in the case where the gas turbine 44 does not overlap, in the front-rear direction, the region between the rotation trajectory D and the rotation trajectory E. More preferably, the gas turbine 44 is arranged at such a position that the sum of the range in which the region F intersects the rotation trajectory D and the range in which the region F intersects the rotation trajectory E is minimized.

Advantageous Effects

When the VTOL rotor 18V or the cruise rotor 22C is damaged, or when the high-voltage harness 80V or the high-voltage harness 82C is damaged, there is a possibility that the VTOL rotor 18V or the cruise rotor 22C fails.

In the aircraft 10 of the present embodiment, it is possible to continue the flight even when a part of the VTOL rotors 18V or a part of the cruise rotors 22C fails. However, it is desirable to reduce the number of the VTOL rotors 18V and the number of the cruise rotors 22C that may fail.

In the aircraft 10 of the present embodiment, the cruise rotor 22C is arranged forward of the gas turbine 44. As a result, when a rotor burst occurs in the gas turbine 44, it is possible to avoid contact between the scattered fragments of the gas turbine 44 and the cruise rotor 22C.

Further, each main power source device 32 includes the gas turbine 44, the generator 46, and the PCU 48 that are arranged in this order from the rear of the fuselage 12. Furthermore, the cruise electric motor 24C is arranged forward of the gas turbine 44. Thus, the high-voltage harness 82C for supplying electric power to the cruise electric motor 24C is wired forward of the gas turbine 44. Therefore, when a rotor burst occurs in the gas turbine 44, it is possible to avoid contact between the scattered fragments of the gas turbine 44 and the high-voltage harness 82C. This makes it possible to avoid failure of the cruise rotor 22C even when a rotor burst occurs in the gas turbine 44.

In the aircraft 10 of the present embodiment, the gas turbine 44 is arranged in a manner so that the gas turbine 44 overlaps, in the front-rear direction of the fuselage 12, the region between the rotation trajectory B of the rotor 18V5 and the rotation trajectory C of the rotor 18V7. As a result, the sum of the range in which the region F intersects the rotation trajectory B and the range in which the region F intersects the rotation trajectory C can be made smaller than in the case where the gas turbine 44 does not overlap, in the front-rear direction, the region between the rotation trajectory B and the rotation trajectory C. Therefore, when a rotor burst occurs in the gas turbine 44, it is possible to reduce the possibility of contact between the scattered fragments of the gas turbine 44 and the rotor 18V5. In addition, when a rotor burst occurs in the gas turbine 44, it is possible to reduce the possibility of contact between the scattered fragments of the gas turbine 44 and the rotor 18V7.

Further, the high-voltage harness 80V5_1 and the high-voltage harness 80V7_2 are arranged inside the rear wing 14b so as to be separated from each other in the front-rear direction of the fuselage 12. As a result, when a rotor burst occurs in the gas turbine 44, it is possible to reduce the possibility that the scattered fragments of the gas turbine 44 come into contact with both the high-voltage harness 80V5_1 and the high-voltage harness 80V7_2. Therefore, even when a rotor burst occurs in the gas turbine 44, it is possible to reduce the possibility that the rotor 18V5 and the rotor 18V7 fail at the same time.

In the aircraft 10 of the present embodiment, the gas turbine 44 is arranged in a manner so that the gas turbine 44 overlaps, in the front-rear direction of the fuselage 12, the region between the rotation trajectory D of the rotor 18V6 and the rotation trajectory E of the rotor 18V8. As a result, the sum of the range in which the region F intersects the rotation trajectory D and the range in which the region F intersects the rotation trajectory E can be made smaller than in the case where the gas turbine 44 does not overlap, in the front-rear direction, the region between the rotation trajectory D and the rotation trajectory E. Therefore, when a rotor burst occurs in the gas turbine 44, it is possible to reduce the possibility of contact between the scattered fragments of the gas turbine 44 and the rotor 18V6. In addition, when a rotor burst occurs in the gas turbine 44, it is possible to reduce the possibility of contact between the scattered fragments of the gas turbine 44 and the rotor 18V8.

Further, the high-voltage harness 80V6_2 and the high-voltage harness 80V8_1 are arranged inside the rear wing 14b so as to be separated from each other in the front-rear direction of the fuselage 12. As a result, when a rotor burst occurs in the gas turbine 44, it is possible to reduce the possibility that the scattered fragments of the gas turbine 44 come into contact with both the high-voltage harness 80V6_2 and the high-voltage harness 80V8_1. Therefore, even when a rotor burst occurs in the gas turbine 44, it is possible to reduce the possibility that the rotor 18V6 and the rotor 18V8 fail at the same time.

Invention Obtained from Embodiment

The invention that can be grasped from the above embodiment will be described below.

Provided is the aircraft (10) including: the wing (14b) attached to the fuselage (12) and configured to generate lift; the generator (46) configured to generate electric power; the engine (44) configured to drive the generator; the first rotor (18V5) configured to generate thrust in the vertical direction; the second rotor (18V7) configured to generate thrust in the vertical direction; the first electric motor (20V5_1) configured to drive the first rotor; the second electric motor (20V7_2) configured to drive the second rotor; the first harness (80V5_1) that is at least partially wired inside the wing and is configured to transmit the electric power generated by the generator to the first electric motor; and the second harness (80V7_2) that is at least partially wired inside the wing and is configured to transmit the electric power generated by the generator to the second electric motor, wherein the engine is arranged in a manner so that the engine overlaps the wing in the front-rear direction of the fuselage, and the first harness and the second harness are arranged inside the wing so as to be separated from each other in the front-rear direction of the fuselage. According to this feature, even when a rotor burst occurs in the engine, it is possible to reduce the possibility that the first rotor and the second rotor fail at the same time.

Provided is the aircraft including: the wing attached to the fuselage and configured to generate lift; the generator configured to generate electric power; the engine configured to drive the generator; the first rotor configured to generate thrust in the vertical direction; the second rotor configured to generate thrust in the vertical direction; the first electric motor configured to drive the first rotor; and the second electric motor configured to drive the second rotor, wherein the engine is arranged in a manner so that the engine overlaps the wing in the front-rear direction of the fuselage, and the engine is arranged in a manner so that the engine overlaps, in the front-rear direction of the fuselage, a region between the rotation trajectory of the first rotor and the rotation trajectory of the second rotor. According to this feature, even when a rotor burst occurs in the engine, it is possible to reduce the possibility that the first rotor and the second rotor fail at the same time.

In the above-described aircraft, the engine may be arranged in a manner so that the engine overlaps, in the front-rear direction of the fuselage, the region between the rotation trajectory of the first rotor and the rotation trajectory of the second rotor. According to this feature, when a rotor burst occurs in the engine, it is possible to reduce the possibility of contact between the scattered fragments of the engine and the first rotor. In addition, when a rotor burst occurs in the engine, it is possible to reduce the possibility of contact between the scattered fragments of the engine and the second rotor.

The above-described aircraft may further include: the third rotor (22C1) configured to generate thrust in the horizontal direction; the third electric motor (24C1_1, 24C1_2) configured to drive the third rotor; and the third harness (82C1_1, 82C1_2) configured to transmit the electric power generated by the generator to the third electric motor, wherein the generator may be arranged forward of the engine in the front-rear direction of the fuselage, the third rotor may be arranged forward of the engine in the front-rear direction of the fuselage, and the third electric motor may be arranged forward of the engine in the front-rear direction of the fuselage. According to this feature, when a rotor burst occurs in the engine, it is possible to avoid contact between the scattered fragments of the engine and the third rotor. In addition, when a rotor burst occurs in the engine, it is possible to avoid contact between the scattered fragments of the engine and the third harness.

The above-described aircraft may further include the boom (16L) attached to the wing and extending in the front-rear direction of the fuselage, wherein the generator and the engine may be provided in the fuselage, the first rotor and the first electric motor may be provided at the boom, and the second rotor and the second electric motor may be provided at the boom. According to this feature, even when a rotor burst occurs in the engine, it is possible to reduce the possibility that the first rotor and the second rotor fail at the same time.

Note that the present invention is not limited to the above disclosure, and various modifications are possible without departing from the essence and gist of the present invention.

The invention claimed is:

1. An aircraft comprising:
   a wing attached to a fuselage and configured to generate lift;
   a generator configured to generate electric power;
   an engine configured to drive the generator;
   a first rotor configured to generate thrust in a vertical direction;
   a second rotor configured to generate thrust in the vertical direction;
   a first electric motor configured to drive the first rotor;
   a second electric motor configured to drive the second rotor;
   a first harness that is at least partially wired inside the wing and is configured to transmit the electric power generated by the generator to the first electric motor; and
   a second harness that is at least partially wired inside the wing and is configured to transmit the electric power generated by the generator to the second electric motor,
   wherein the engine is arranged in a manner so that the engine overlaps the wing in a front-rear direction of the fuselage,
   the first harness and the second harness are arranged inside the wing so as to be separated from each other in the front-rear direction of the fuselage,
   inside the wing, a front spar, a middle spar, and a rear spar are provided in order of the front spar, the middle spar, and the rear spar from a front side of the fuselage in the front-rear direction of the fuselage,
   the first harness is disposed between the front spar and the middle spar in the front-rear direction of the fuselage, and
   the second harness is disposed between the middle spar and the rear spar in the front-rear direction of the fuselage.

2. The aircraft according to claim 1, wherein
   the engine is arranged in a manner so that the engine overlaps, in the front-rear direction of the fuselage, a region between a rotation trajectory of the first rotor and a rotation trajectory of the second rotor.

3. The aircraft according to claim 1, further comprising:
   a third rotor configured to generate thrust in a horizontal direction;
   a third electric motor configured to drive the third rotor; and
   a third harness configured to transmit the electric power generated by the generator to the third electric motor,
   wherein the generator is arranged forward of the engine in the front-rear direction of the fuselage,
   the third rotor is arranged forward of the engine in the front-rear direction of the fuselage, and
   the third electric motor is arranged forward of the engine in the front-rear direction of the fuselage.

4. The aircraft according to claim 1, further comprising a boom attached to the wing and extending in the front-rear direction of the fuselage,
   wherein the generator and the engine are provided in the fuselage,
   the first rotor and the first electric motor are provided at the boom, and
   the second rotor and the second electric motor are provided at the boom.

5. The aircraft according to claim 1, wherein
   the first harness is disposed nearer to the front spar than the middle spar in the front-rear direction of the fuselage, and
   the second harness is disposed nearer to the rear spar than the middle spar in the front-rear direction of the fuselage.

6. An aircraft comprising:
   a wing attached to a fuselage and configured to generate lift;
   a generator configured to generate electric power;
   an engine configured to drive the generator;
   a first rotor configured to generate thrust in a vertical direction;
   a second rotor configured to generate thrust in the vertical direction;
   a first electric motor configured to drive the first rotor;
   a second electric motor configured to drive the second rotor;
   a first harness that is at least partially wired inside the wing and is configured to transmit the electric power generated by the generator to the first electric motor; and a second harness that is at least partially wired inside the wing and is configured to transmit the electric power generated by the generator to the second electric motor, wherein the engine is arranged in a manner so that the engine overlaps the wing in a front-rear direction of the fuselage, the first harness and the second harness are arranged inside the wing so as to be separated from each other in the front-rear direction of the fuselage, and a partition wall that partitions a space inside the wing is provided between the first harness and the second harness.

* * * * *